United States Patent
Botting (10) Patent No.: US 9,144,330 B2
(45) Date of Patent: Sep. 29, 2015

(54) DISPLAY DEVICE

(71) Applicant: Performance Enclosures Limited, Wallingford, Oxfordshire (GB)

(72) Inventor: David Botting, Wallingford (GB)

(73) Assignee: PERFORMANCE ENCLOSURES LIMITED, Wallingford, Oxfordshire (GB)

( * ) Notice: Subject to any disclaimer, the term of this patent is extended or adjusted under 35 U.S.C. 154(b) by 181 days.

(21) Appl. No.: 13/689,909

(22) Filed: Nov. 30, 2012

(65) Prior Publication Data

US 2013/0134280 A1 May 30, 2013

(51) Int. Cl.
*A47G 29/00* (2006.01)
*A47F 5/00* (2006.01)
*G06F 3/042* (2006.01)
*G03B 21/10* (2006.01)
*A47B 97/04* (2006.01)
*H04N 7/14* (2006.01)

(52) U.S. Cl.
CPC .............. *A47F 5/0081* (2013.01); *G03B 21/10* (2013.01); *G06F 3/0425* (2013.01); *A47B 97/04* (2013.01); *H04N 7/142* (2013.01)

(58) Field of Classification Search
CPC ....... A47F 5/0081; A47F 97/04; A47B 85/06; A47B 2200/25; A47B 3/00; A47B 17/02; A47B 27/18; A47B 9/02

USPC ........... 248/371, 188.6; 108/70, 99, 115, 145, 108/147, 2, 50.02, 6, 7

See application file for complete search history.

(56) References Cited

U.S. PATENT DOCUMENTS

| | | | | |
|---|---|---|---|---|
| 5,313,892 A | * | 5/1994 | Tice | 108/147 |
| 5,970,980 A | * | 10/1999 | Adair | 128/849 |
| 6,336,414 B1 | * | 1/2002 | Stewart et al. | 108/50.02 |
| 8,042,208 B2 | * | 10/2011 | Gilbert et al. | 5/607 |
| 2001/0018882 A1 | * | 9/2001 | Recknagel et al. | 108/50.01 |
| 2006/0249059 A1 | * | 11/2006 | Gagne | 108/59 |
| 2007/0157856 A1 | | 7/2007 | Skoog et al. | |
| 2009/0114130 A1 | * | 5/2009 | Chirea et al. | 108/124 |
| 2010/0188642 A1 | | 7/2010 | Falendysz et al. | |
| 2011/0168062 A1 | * | 7/2011 | Dellavecchia | 108/7 |

FOREIGN PATENT DOCUMENTS

| GB | 2456023 A | 7/2009 |
|---|---|---|
| JP | 2008093069 A | 4/2008 |

* cited by examiner

*Primary Examiner* — Joanne Silbermann
(74) *Attorney, Agent, or Firm* — Fraser Clemens Martin & Miller LLC; Jacob M. Ward (57) ABSTRACT

A display device 10 comprises a base 16, a first flat display area 12 and a second flat display area 14, the first display area 12 being pivotally mounted and angularly movable relative to the base 16 about an axis of rotation, the second display area 14 being pivotally mounted to and independently angularly movable relative to the base 16 about said axis of rotation, the first and second display areas 12, 14 being arranged to align with one-another in the same plane to form a single flat display area in at least one position.

20 Claims, 7 Drawing Sheets

Figure 12

DISPLAY DEVICE

CROSS-REFERENCE TO RELATED APPLICATIONS

This application claims the benefit of Great Britain Patent No. GB 1120561.4, filed Nov. 30, 2011. The entire disclosure of the above application is hereby incorporated herein by reference.

FIELD OF THE INVENTION

The present invention relates to a display device suitable for use with touch-screen technologies and particularly but not exclusively for use with interactive whiteboards.

BACKGROUND TO THE INVENTION

In universities, schools, boardrooms and other educational environments, there is a need to provide access to touch-screen technology, including in particular, interactive whiteboards and/or large screen displays.

It is known to provide display screens and projectors on stands, for example, as shown in GB 2456023A. However, it has been found in use that such devices are not ideally adapted to being moved, for example, between lecture theatres, do not provide displays which can be viewed easily from different positions relative to the display and are not particularly robust. Such devices are also often specific to a particular type of display technology, and are not adaptable to allow use of the many different interactive display technologies now available.

It is an object of the invention to provide a display device which reduces or substantially obviates the above mentioned problems.

STATEMENT OF INVENTION

According to the present invention, there is provided a display device comprising a base, a first flat display area and a second flat display area, the first display area being pivotally mounted to and angularly movable relative to the base about an axis of rotation, the second display area being pivotally mounted to and independently angularly movable relative to the base about said axis of rotation, the first and second display areas being arranged to align with one-another in the same plane to form a single flat display area in at least one position.

Advantageously, the display device provides two display areas, each of which can be viewed in multiple orientations. The display areas may be arranged in the same plane to form a single combined display area, which also may be viewed in multiple orientations.

The first display area may be displaced from the axis of rotation. The second display area may extend substantially adjacent the axis of rotation.

The first and second display areas may be pivotable between substantially horizontal and vertical positions. In this manner, the display device provides a display solution that is equally adapted to a collaborative environment such as a meeting or round table discussion, where participants may surround the device with at least one of the display areas in a substantially horizontal position, as well as a more formal presentation environment, with participants seated or standing and observing at least one of the display areas in a substantially vertical position.

The position of the common pivotal axis may be movable vertically relative to the ground, thus allowing for positioning of the display areas at a convenient vertical location.

Resistance means may be provided for providing controlled resistance to the pivoting movement of at least one of the display areas. Such resistance means may provide enhanced ease of use and or safety of the display device, particularly in the case of larger display areas.

The display areas may be locked in substantially any position between the substantially horizontal position and the substantially vertical position. For example, the display areas may be locked in a desired display orientation, or may be locked in an orientation particularly suited to transport or storage. The independent pivoting motion of the two display areas allows each display area to be placed in the most suitable orientation for any given situation, including for example an orientation that enables the display device to pass freely through corridors and doorways during transit.

The display device may further comprise drive means, which may be operable to drive pivotal motion of at least one of the display areas. Such drive means may eliminate the need for a user to physically manipulate the display areas, and may also provide extremely fine control of the angular orientation of the display areas. The drive means may be programmable, such that specific orientations of the first and second display areas may be stored in a programmable device, thus allowing easy deployment of the device to frequently used orientations.

The base of the display device may comprise a chassis having two spaced longitudinally extending spars and first and second side rails connecting the spars. The base may further comprise four wheels mounted to the chassis, each wheel being positioned proximate an end of one of the first and second side rails and facilitating easy movement of the device. Brakes or other locking devices may be provided to enable the device to be locked in position relative to the ground once it is in the desired location.

The base may further comprise first second and third support legs extending upwardly from the chassis. The first and second support legs may extend along axes in a vertical plane that includes the common pivotal axis, and the third support leg may extend along an axis that is spaced from the vertical plane. In this manner, the support legs may present a triangular support base that offers excellent stability.

The support legs may be adjustable in length. Each of the support legs may include a lower leg part and an upper leg part, the upper leg part being received at least partly within the lower leg part and telescopically extending from the lower leg part. Drive means may be provided to extend or retract the upper leg parts out of/into the lower leg parts.

The base may further comprise a base frame which may be rigidly mounted on the first second and third support legs. The base frame may for example be a substantially horizontally extending, planar framework and may comprise a pivot rod extending along the common pivotal axis. The pivot rod may for example extend along one longitudinal edge of the base frame.

The first display area may be mounted on a first support frame, and the second display area may be mounted on a second support frame. The first and second display areas may be rigidly mounted on the respective support frames.

Each of the first and second support frames may be mounted on the base frame for pivotal motion about the common pivotal axis.

The drive means may act between the base and at least one of the support frames. For example, the drive means may act between the third support leg and the first or second support frame. The drive means may comprise two independent drive devices, a first of which may act between the base and the first support frame, and a second of which may act between the base and the second support frame. The drive devices may for example comprise linear actuators and may extend through the base frame between the support leg and the support frame or frames.

The display device may further comprise a flexible interconnection means, through which service cables may pass. For example, should one or both of the display areas include a display apparatus requiring electrical power, both power and data cables may pass through the flexible interconnection means, keeping the cables neatly contained and out of way when the display areas are being pivoted to a new orientation, or when the base frame is being raised or lowered on the support legs.

At least one of the first and second display areas may includes a planar work surface and a flat touch screen display may be set into or mounted on the work surface. Alternatively, a projector screen may be set into or mounted on the work surface.

A mounting column may extend from the first display area, operable to receive a projector. The ability of the two display areas to pivot independently enables arrangement for either forward or rear projection onto a projection screen mounted or set into the second display area.

Locking means may be provided for locking the first and second display areas together in a common plane.

Advantageously, the display device may be made from metal, making it strong and durable. Furthermore, it can be used to display an interactive whiteboard, either projected or displayed on an LCD or other screen. Also, the displayed image need not be interactive.

DESCRIPTION OF THE DRAWINGS

For a better understanding of the present invention, and to show more clearly how it may be carried into effect, reference will now be made, by way of example, to the accompanying drawings, in which.

DESCRIPTION OF PREFERRED EMBODIMENTS

Referring to the accompanying FIGS. 1-12, a display device is indicated generally at 10. The display device 10 comprises a first planar display area 12 and a second planar display area 14. The first and second display areas 12, 14 are mounted on a base 16, which is robust and moveable.

The base 16 comprises a chassis 18 formed from two parallel longitudinally extending spars 20, 22 and two connecting side rails 24, 26. As illustrated most clearly in the perspective views of FIGS. 2 and 5, the spars 20, 22 extend between the side rails 24, 26 to form the rigid chassis structure. The rear spar 20 is wider and thicker than the forward spar 22. The rear spar 20 extends between the side rails 24, 26 substantially adjacent the rear ends of the side rails. The forward spar 22 is spaced back a distance from the forward ends of the side rails 24, 26, positioned between a central region of the side rails and the forward ends of the side rails. Large caster wheels 27 are connected to each end of the first and second rails 24, 26, enabling the display device 10 to be moved with ease. The casters are pivoted vertically as well as about their rolling axis and are also lockable by means of a foot pedal 29. This enables the display device 10 to be positioned, for example in a lecture theatre, and locked in position whilst in use.

Figure 7:
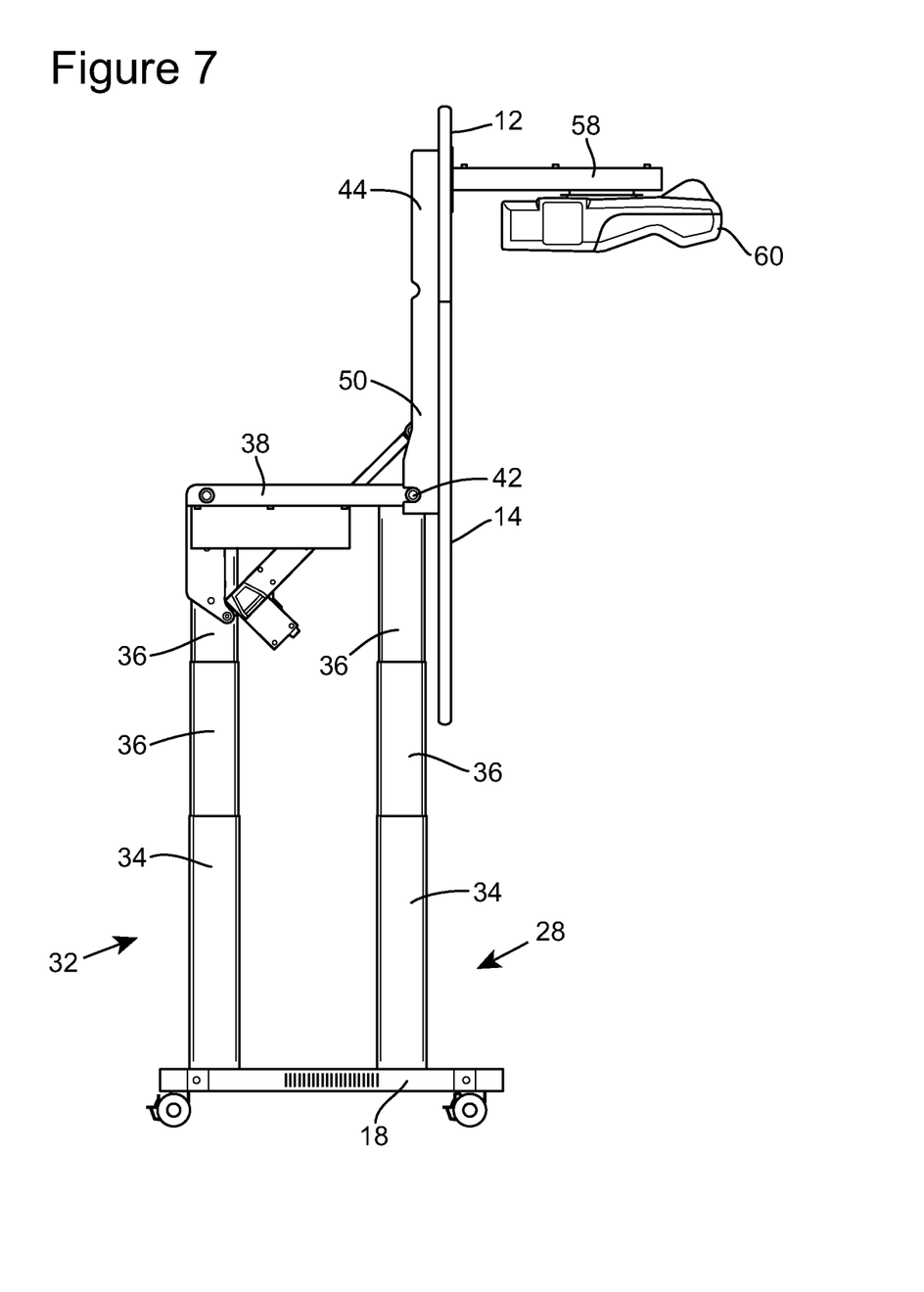
FIG. 7 shows a side view of the display device of FIG. 1 in the second orientation.
Figure 8:
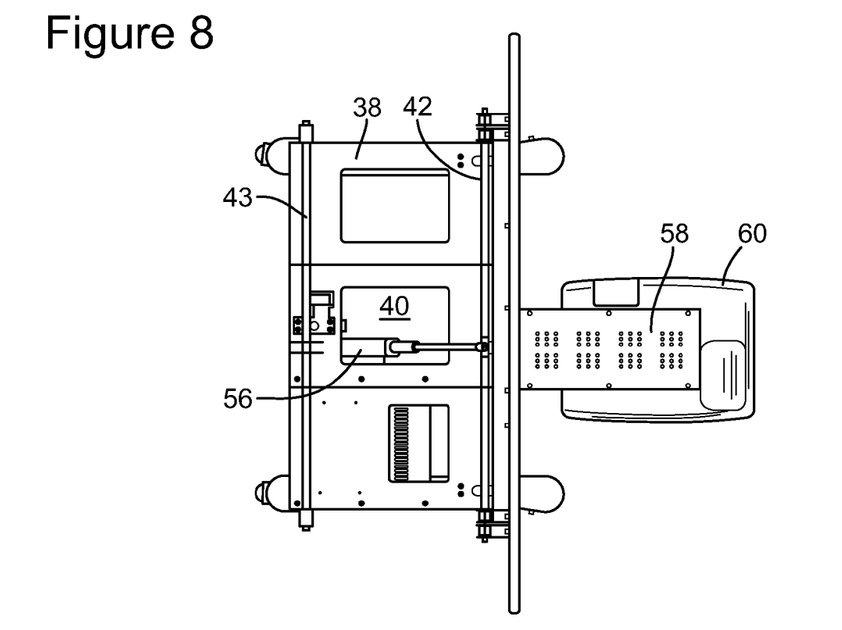
FIG. 8 shows a rear view of the display device of FIG. 1 in the second orientation.

Three supporting legs 28, 30, 32 extend vertically from the chassis 18. First and second supporting legs 28, 30 extend from respective side rails 24, 26 at a position substantially adjacent the forward spar 22. A third supporting leg 32 extends from a central region of the rear spar 20, such that the three supporting legs are located at three points of a triangle, when viewed from above. The three supporting legs 28, 30, 32 are adjustable in length. As illustrated particularly in FIG. 7, each leg comprises a lower leg part 34 and one or more telescoping upper leg parts 36. In a stowed or retracted position, as illustrated for example in FIG. 4, the upper leg parts 36 are retracted within one another and into the lower leg part 34. In a deployed position, as illustrated in FIG. 7, the upper leg parts 36 extend from each other and from the lower leg part 34. Linear actuators (not shown) or other drive means may be positioned within the supporting legs to deploy and retract the legs as required.

A base frame 38 is rigidly mounted on the upper leg parts of the supporting legs 28, 30, 32. The base frame 38 is most clearly illustrated in FIGS. 7 and 8, and comprises a substantially planar supporting framework having at least one opening 40 extending through a central region of the base frame 38. The base frame 38 is mounted substantially horizontally on the supporting legs 28, 30, 32, the triangular arrangement of the supporting legs providing a secure base and eliminating wobble and stability issues that can arise with existing display devices. A pivot rod 42 is rigidly mounted along a front edge of the base frame 38 and defines a common axis of rotation for the first and second display areas 12, 14. The pivot rod 42 extends horizontally substantially the full width of the base frame 38 and is mounted at or adjacent to the forward edge of the frame, substantially above the forward support legs 28, 30. In this manner the forward support legs 28, 30 and the pivot rod 42 all extend in substantially the same vertical plane, as illustrated for example in the side view of FIG. 7. A second pivot rod 43 extends along a rear edge of the base frame 38.

Figure 9:
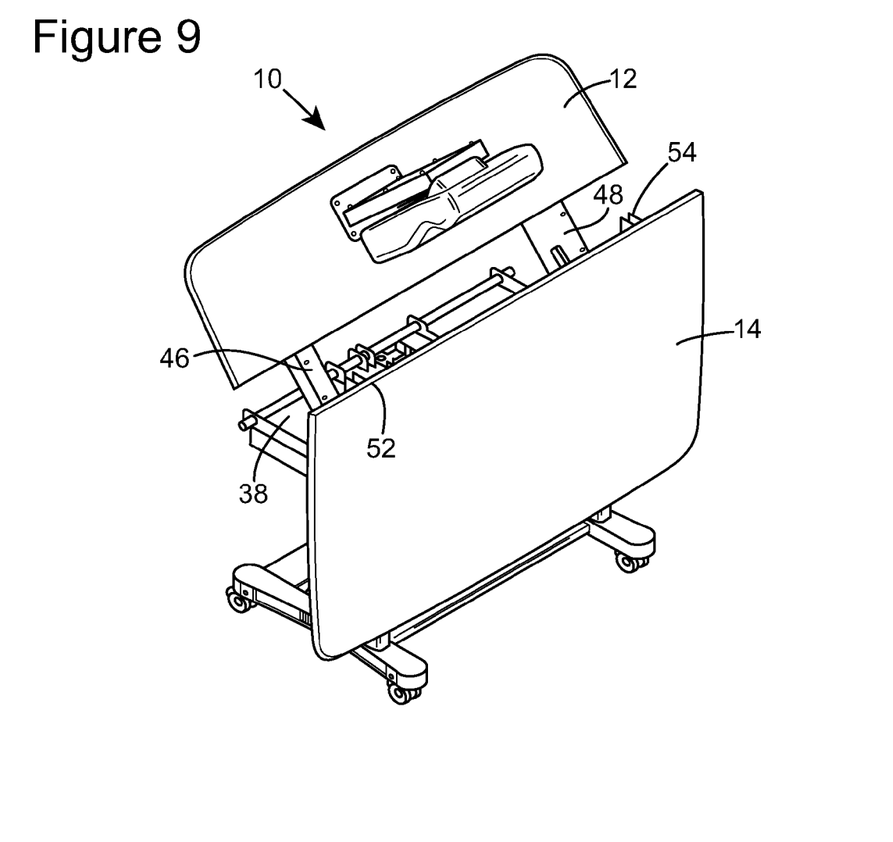
FIG. 9 shows a perspective view of the display device of FIG. 1 in a third orientation with the second display area in a vertical position and the first display area in a tilted position for transit, and with support legs retracted.
Figure 10:
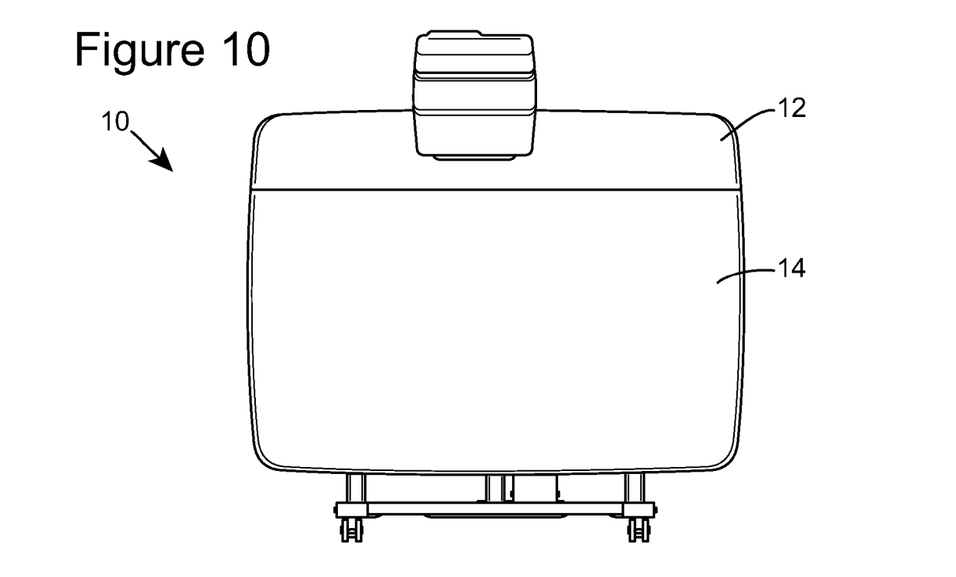
FIG. 10 shows a front view of the display device of FIG. 1 in the third orientation.
Figure 11:
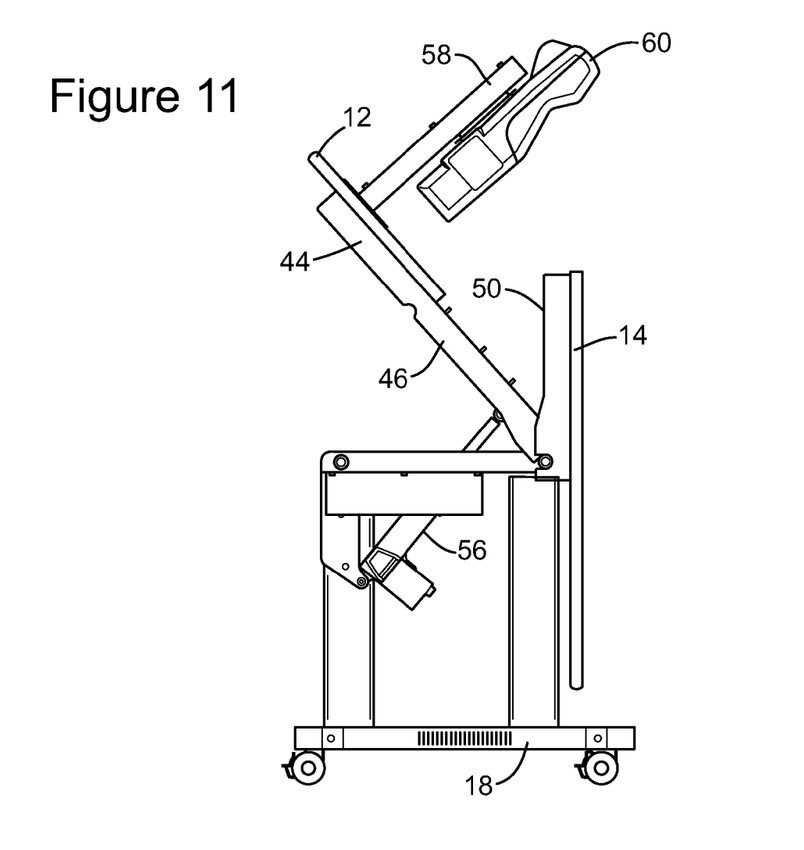
FIG. 11 shows a side view of the display device of FIG. 1 in the third orientation.
Figure 12:
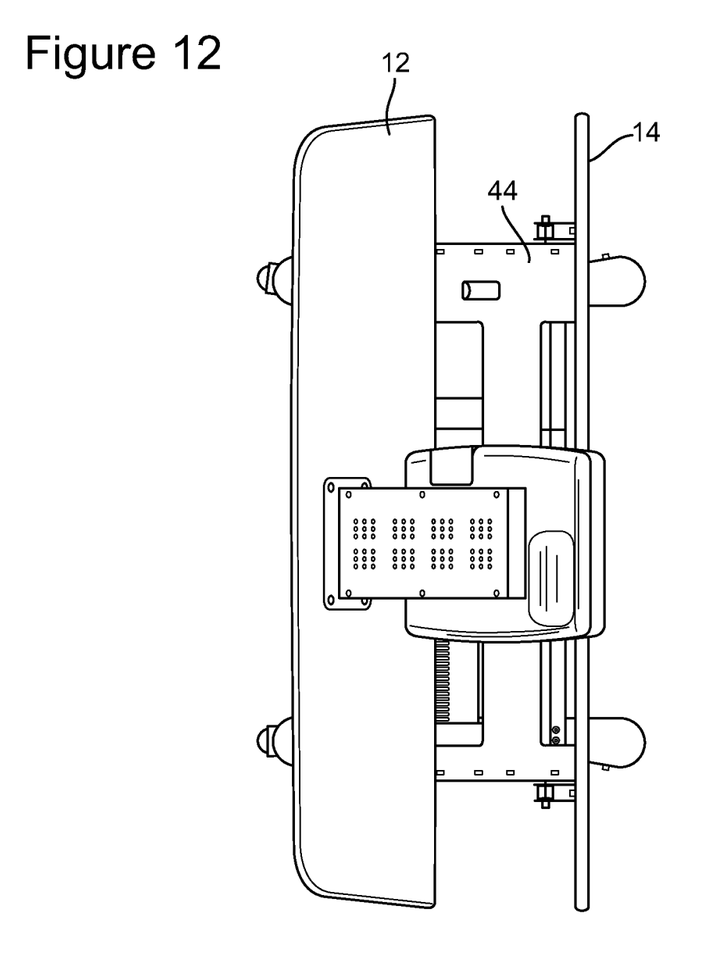
FIG. 12 shows a plan view of the display device of FIG. 1 in the third orientation.

Each of the first and second display areas comprises a substantially planar component, and each display area is independently rotatably mounted on the base frame 38 via a dedicated support frame and the pivot rod 42. The second display area is mounted substantially adjacent the pivot rod 42, while the first display area is spaced away from the pivot rod 42. With particular reference to FIGS. 7, 9 and 11, the first display area is rigidly connected to a first support frame 44 comprising a pair of support arms 46, 48 that are pivotably mounted on the pivot rod 42. The arms 46, 48 may be reinforced by a crossbar. The second display area is rigidly connected to a second support frame 50 comprising a second pair of support arms 52, 54 that are also pivotably mounted on the pivot rod 42. The support arms 46, 48 of the first support frame 44 are positioned inside the arms 52, 54 of the second support frame 50. When the two display areas 12, 14 are aligned in the same plane, the two pairs of support arms extend parallel and adjacent each other in the same plane, as illustrated for example in FIG. 7.

A linear actuator 56 is mounted between the third support leg 32 and the first support frame 44 to control pivoting movement of the first display area. The linear actuator 56 extends through the opening 40 in the base frame 38. A second linear actuator (not shown) may be mounted between the third support leg 32 and the second support frame 50 to control pivoting motion of the second display area in a similar manner. Alternatively, one of the display areas may be operable for manual adjustment by a user. In this case, a biasing or resistance element (not shown) may be included to provide controlled resistance to pivoting motion of the display area, and/or to bias the display area to a desired position when not locked in place. A brake or locking element may also be provided to fix the display area in a desired position and/or to hold the two display areas in the same plane, so as to provide a large combined display area. According to alternative embodiments, the linear actuator 56 may be replaced by a compressed gas actuator or any other suitable drive means including mechanical devices. The linear actuator 56 may be controlled by an electrical controller, and may be programmable by a user. In this manner, a series of preset orientations for the first and second display areas may be programmed into the controller, including for example, a horizontal combined display area, a vertical combined display area, and a transit configuration. These configurations are discussed in further detail below.

Figure 1:
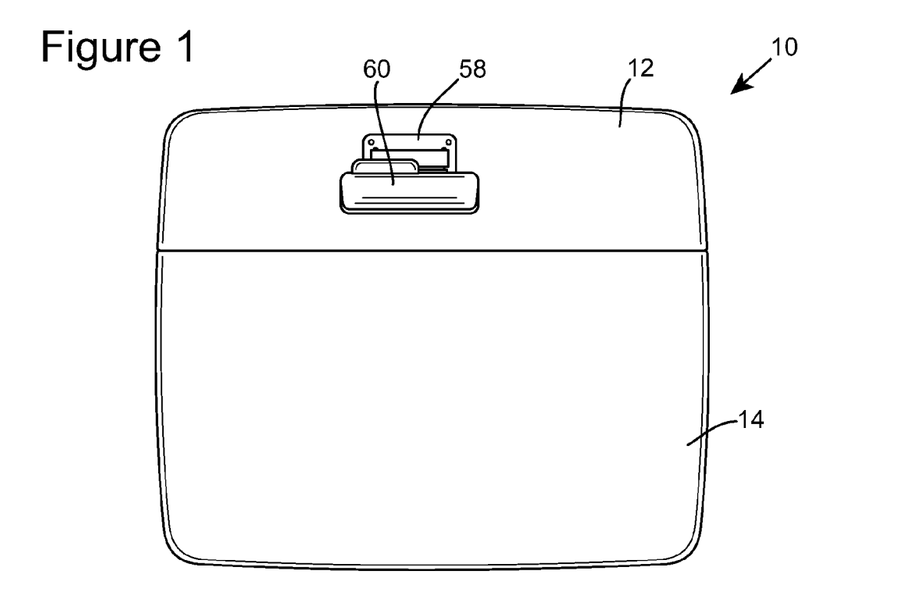
FIG. 1 shows a plan view of a display device in a first orientation with first and second display areas in a horizontal position and with support legs retracted.
Figure 2:
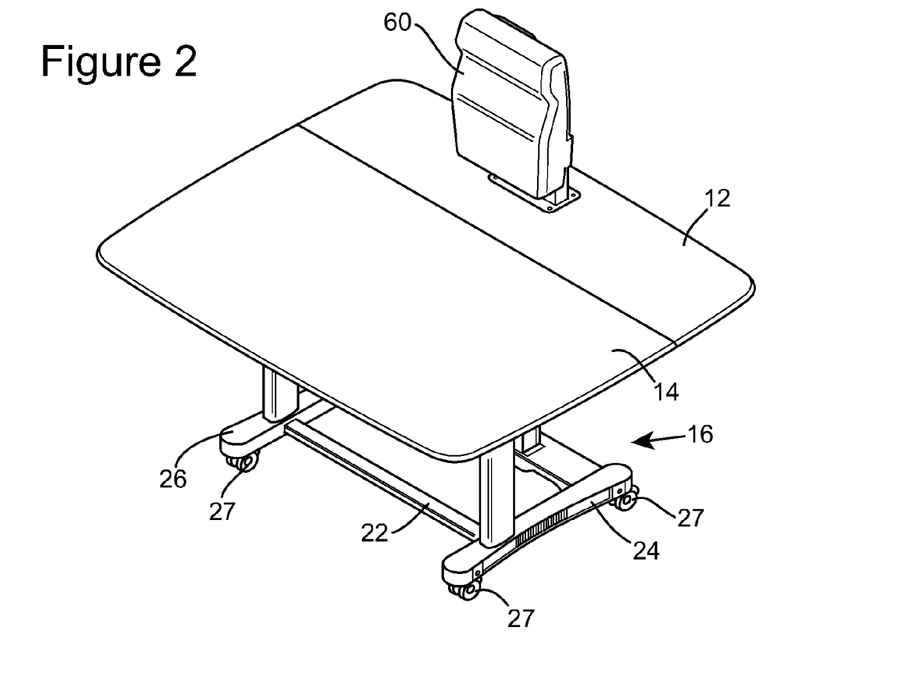
FIG. 2 shows a perspective view of the display device of FIG. 1 in the first orientation.
Figure 3:
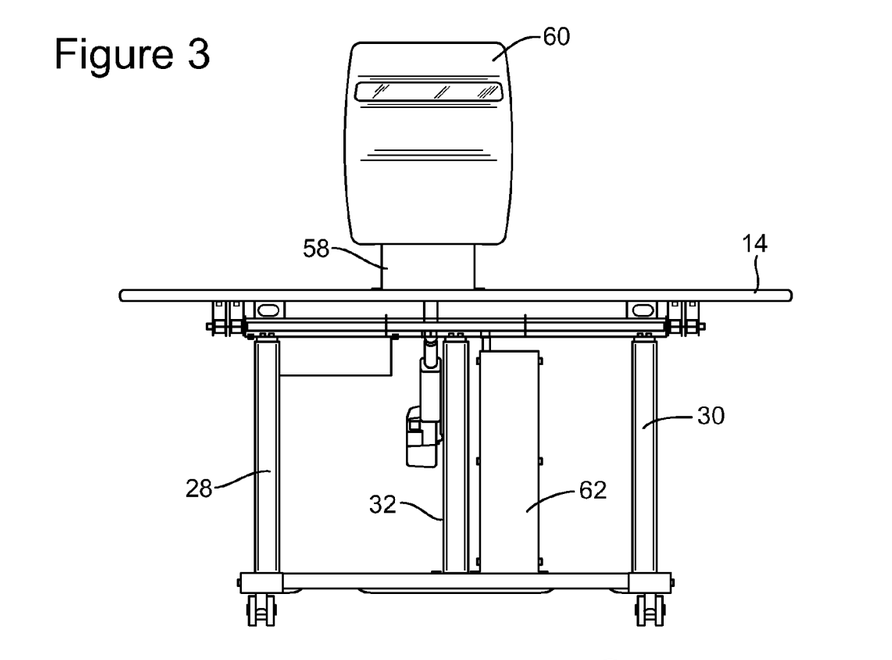
FIG. 3 shows a rear view of the display device of FIG. 1 in the first orientation.
Figure 4:
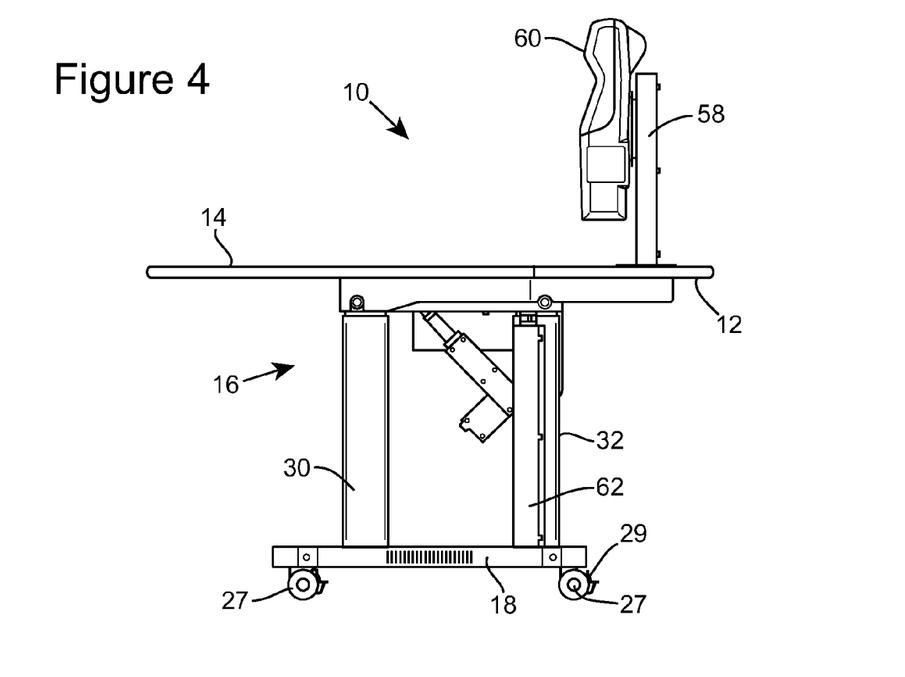
FIG. 4 shows a side view of the display device of FIG. 1, in the first orientation.
Figure 5:
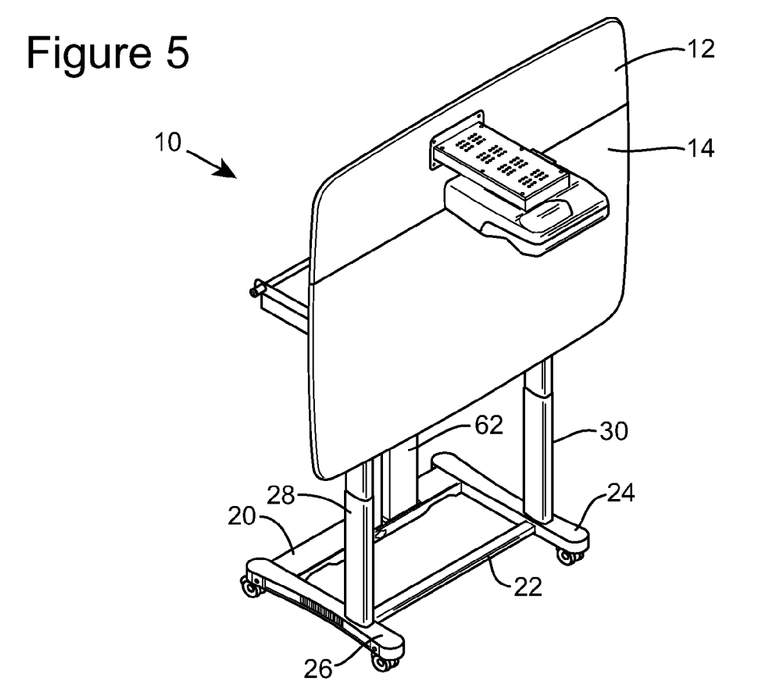
FIG. 5 shows a perspective view of the display device of FIG. 1 in a second orientation with first and second display areas in a vertical position and with support legs deployed.
Figure 6:
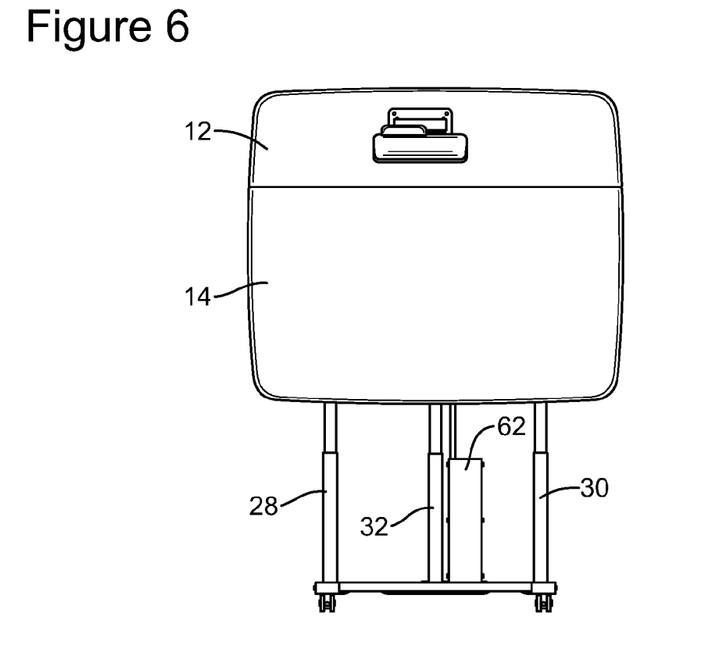
FIG. 6 shows a front view of the display device of FIG. 1 in the second orientation.

Each of the first and second display areas 12, 14 may comprise any one of a range of display apparatus, including for example an interactive touch screen or a projection screen. The display apparatus may be interchangeable, an appropriate apparatus being mounted on the relevant display area 12, 14 as required. The first display area comprises a mounting column 58 on which may be mounted a projector 60, as illustrated in the Figures. The projector 60 may project directly onto the front of the display surface of the second display area 14, for example if the two display areas 12, 14 are in the same plane as illustrated in FIG. 5. Alternatively, the projector 60 may project from the rear of a projection screen mounted on the second display area 14, a configuration that is particularly useful for mobile video conferencing applications. It will be understood that the variety of configurations in which the display device 10 can be arranged enables the device 10 to accommodate a wide range of display solutions.

A flexible connector 62 is mounted on the chassis 18 of the device 10 to receive electrical and data cables that may be required for a projector, plasma touch screen or other display device. The connector ensures the cables are held neatly and are out of the way of the pivoting display areas 12, 14.

In use, the display device 10 may be arranged in a variety of configurations, three of which are illustrated in the attached Figures. FIGS. 1 to 4 illustrate a horizontal, table like arrangement, with the support legs 28, 30, 32 retracted to place the aligned display areas 12, 14 at a comfortable height and with a projector 60 mounted on the first display area 12. This arrangement facilitates collaboration and interactive team working around the display device 10, on which may be projected an image such as an interactive whiteboard. Alternatively, a touch screen or other display apparatus may be mounted within the second display area 14. The combined display area may also be used as a standard table in this configuration.

FIGS. 5 to 8 illustrate a vertical arrangement of the first and second display areas 12, 14, with the support legs fully extended. This arrangement is particularly suited to a presentation environment, with the vertically aligned display areas 12, 14 elevated on the support legs 28, 30, 32 for ease of viewing. A presenter or presentation team may interact with the display device while being viewed by a number of participants. It will be appreciated that it may be desirable to tilt the combined display areas slightly away from the vertical, according to the particular arrangement of the presentation areas and the ambient light conditions.

FIGS. 9 to 12 illustrate the display device 10 configured for transport. The support legs 28, 30, 32 are retracted to reduce the overall height of the device 10 for passing through doorways. The second display area 14 is vertically oriented so as not to project forwards of the base 16 and the first display area 12 is tilted at an angle. Viewed from the side as in FIG. 11, it will be appreciated that the angle of the first display area 12 is such that the display area does not protrude past the rear edge of the base 16, and the projector 60 mounted on the mounting column 58 does not protrude past the front edge of the base 16. The footprint of the device 10 in this configuration is thus no greater than the footprint of the chassis 18. The width of the chassis may for example be 750 mm and the combined height of the device 10 in this configuration may be 1650 mm, thus ensuring that the device can be easily wheeled between meeting or lecture rooms, into and out of lifts and through corridors and doorways.

It will be appreciated that a display device according to the present invention provides a versatile display solution that may be adapted for use with a wide range of different display apparatus and for use in many different environments. The independent pivoting motion of the two display areas ensures that while providing a large combined display area, the device is still practical for storage and transport, thus facilitating shared use for example within an office or university building. Different display apparatus may be mounted on one or both of the display areas, and those display areas may then be placed in the required configuration for the particular apparatus and working environment.

It is understood that variations may be made in the foregoing without departing from the scope of the invention. For example, the elements and teachings of the various illustrative embodiments may be combined in whole or in part in some or all of the illustrative embodiments within the scope of the claims. In addition, one or more of the elements and teachings of the various illustrative embodiments may be omitted, at least in part, and/or combined, at least in part, with one or more of the other elements and teachings of the various illustrative embodiments within the scope of the claims.

The invention claimed is:

1. A display device comprising:
   a base,
   a first flat display area and a second flat display area, the first flat display area being pivotally mounted and angularly movable relative to the base about an axis of rotation, the second flat display area being pivotally mounted to and independently angularly movable relative to the base and the first display area about said axis of rotation, the first and second flat display areas being arranged to align with one-another in a same plane to form a single flat display area in at least one position, wherein the first and second display areas aligned in the same plane as the single flat display area are together angularly movable relative to the base.

2. The display device of claim 1, wherein the first flat display area is spaced apart from the axis of rotation.

3. The display device of claim 1, wherein the first and second flat display areas are pivotable between substantially horizontal and vertical positions.

4. The display device of claim 1, wherein the position of the common pivotal axis is movable vertically relative to the ground.

5. The display device of claim 1, wherein a resistance means provides controlled resistance to the pivoting movement of at least one of the first and second flat display areas.

6. The display device of claim 1, wherein the first and second flat display areas are lockable in substantially any position between the substantially horizontal position and the substantially vertical position.

7. The display device of claim 1, further comprising a drive means, operable to drive pivotal motion of at least one of the first and second flat display areas.

8. The display device of claim 1, wherein the base comprises a wheeled chassis having two spaced longitudinally extending spars and first and second side rails connecting the spars.

9. The display device of claim 8, wherein the base further comprises first, second and third support legs extending upwardly from the wheeled chassis.

10. The display device of claim 9, wherein the first and second support legs extend along axes in a vertical plane that includes the common pivotal axis, and the third support leg extends along an axis that is spaced from the vertical plane.

11. The display device of claim 10, wherein the legs are telescopically adjustable in length.

12. The display device of claim 9, wherein the base further comprises a base frame rigidly mounted on the first, second and third support legs.

13. The display device of claim 1, wherein the first flat display area is mounted on a first support frame, and the second flat display area is mounted on a second support frame.

14. The display device of claim 13, wherein each of the first and second support frames is mounted on a base frame for pivotal motion about the common pivotal axis.

15. The display device of claim 13, wherein a drive means acts between the base and at least one of the support frames.

16. The display device of claim 1, further comprising a flexible inter-connection means, through which service cables pass.

17. The display device of claim 1, wherein at least one of the first and second flat display areas includes a planar work surface.

18. The display device of claim 17, wherein a flat touch screen display or projector screen is set into or mounted on the work surface.

19. The display device of claim 1, wherein a mounting column extends from the first flat display area, operable to receive a projector.

20. The display device of claim 1, wherein a locking means is provided for locking the first and second flat display areas in a common plane.

* * * * *